United States Patent Office 3,226,341
Patented Dec. 28, 1965

3,226,341
METHOD OF PREPARING A CATALYST COMPOSITION CONSISTING OF LITHIUM IN A HOST METAL OF EITHER GROUP IB OR VIII
Harry G. Oswin, Chauncey, Jeremy Forten, New York, and Harry C. Lieb, Rockville Centre, N.Y., assignors to Leesona Corporation, Cranston, R.I., a corporation of Massachusetts
No Drawing. Filed Nov. 8, 1961, Ser. No. 150,903
5 Claims. (Cl. 252—474)

This invention relates to catalytically activated metal surfaces and more particularly to systems having lithium incorporated in a host metal. The novel materials are particularly useful as catalysts in hydrogenation and reforming proceses, as well as for use in construction of hydrogen purifiers and fuel cell electrodes.

Briefly, according to the instant invention, it has been discovered that elemental lithium when incorporated in a host metal or alloy provides greatly improved catalytic properties in comparison with the identical parent metal which does not contain lithium. These activated metals can be fabricated and employed as continuous surfaces, as porous sinters or they can be used in powder or granular form. Therefore, it is an object of the instant invention to provide novel materials comprising lithiated metals and alloys which possess highly activated surfaces.

It is another object of this invention to provide lithiated host metals useful as hydrogenation catalysts.

It is another object of this invention to provide lithiated host metals useful as reforming catalysts.

It is another object of this invention to provide nonporous lithiated materials suitable for construction of hydrogen purifiers or generators.

It is another object of the instant invention to provide lithiated materials especially suitable for use as fuel cell electrodes.

These and other objects of the instant invention will become more apparent from the following detailed description with particular emphasis being placed on the illustrative examples.

In accordance with the instant invention, lithium is incorporated into a metal by contacting the metal with elemental lithium at room temperature and above, but below the melting point of the host metal. Although it is not completely clear whether compound formation occurs between the lithium and host metal under these conditions or if a solid solution is formed, it is theorized that lithium atoms enter the solid metal at defect points or holes in the solid lattice. Alternatively, the lithium atoms may diffuse between the regular lattice sites in the metal. While it is not completely clear how the lithium enters the metal, it is established that lithium does penetrate or diffuse into the host metal and becomes incorporated so that it is not removed upon immersion in water. The lithium-host metal systems are metallic in nature, capable of forming a continuous activated surface.

Materials which are conveniently impregnated with elemental lithium according to the instant invention include the pure elements and alloys of groups IB and VIII of the Mendelyeev's Periodic Table. These materials possess the necessary ductility and malleability as well as resistance to corrosion necessary for fuel cell and hydrogen purifier construction. The selection of a metal for lithiation will depend to a large extent upon the end use of the system as well as the commercial availability of host materials. Thus, for a lithiated material for use in a hydrogen purifier, a non-porous membrane or sheet of palladium or palladium-silver alloy capable of diffusing hydrogen at relatively low temperatures would be a proper choice. Since the membrane is permeable to hydrogen, but impermeable to oxygen, nitrogen and other impurities, hydrogen gas having a high degree of purity can be obtained. If the metal system is to be employed as a fuel cell electrode, another metal may be selected due to its superior corrosion resistance under the operating conditions of the fuel cell. Alternatively, if the material is to be used as a catalyst, a metal easily powdered or which is granular in form may be preferred. More specifically, the host or parent metals which are incorporated with lithium according to the instant invention include gold, copper, silver and their alloys from group IB and iron, copper, nickel, ruthenium, rhodium, osmium, platinum, iridium, palladium and their alloys from group VIII of the Periodic Table. While these materials are preferred, it is possible to employ still other materials in the instant invention as long as they are capable of forming a continuous catalytic surface.

Lithium is incorporated into the host metal by a number of methods. Thus, one method comprises immersing the metal into molten lithium, permitting lithium to diffuse or penetrate the metal. Subsequent to the diffusion step, the metal system is removed from the molten lithium melt and heated in an inert atmosphere of helium or argon to a temperature above about 250° C., and preferably above 500° C., but below the melting point of the host metal or alloy. Thereafter, excess lithium is removed by immersion in water. A second method comprises deposition of lithium onto a metal surface and subsequently heating the lithium-host metal system in an inert gas or vacuum to above about 250° C., and preferably above 500° C., but below the melting point of the host metal or alloy. Excess lithium is then removed by immersion of the lithium host metal system in water. A third method comprises diluting the molten lithium with calcium or barium, forming mixtures, including eutectic mixtures, and immersing the host metal into the molten mixture under an inert atmosphere of helium or argon. A modified procedure comprises forming a sodium and potassium eutectic mixture and adding a small amount of lithium to the mixture. The coated metal is removed from the melt and subjected to elevated temperatures. Excess lithium is then removed by immersion of the lithium host metal system into water. This method permits more controllable diffusion of lithium into the host metal.

As another method, lithium compounds are dissolved in a solvent which does not react appreciably with pure lithium, and lithium electroplated onto the host material. For example, lithium halides can be dissolved in solvents such as pyridine or acetonitrile. The electro-deposition is carried out employing an inert atmosphere over the electrolyte. Thereafter, the lithiated structure is subjected to elevated temperatures. Another method comprises dissolving metallic lithinum in liquid ammonia and immersing the host metal in the solution permitting diffusion of lithium into the parent metal. Alternatively, the lithium can be deposited from a solution of liquid ammonia by electroplating. The operation is carried out in an inert atmosphere of helium or argon. After the deposition, the host metal containing diffused lithium is subjected to elevated temperatures. Modifications of the above procedures for depositing the metal can be devised by one skilled in the art.

For certain applications, after the host metal is incorporated with lithium, depending upon its ultimate use, it can be advantageous to polish the surface of the metal. Thus, it has been found that lithiated metals which are polished possess enhanced activity when employed as fuel cell electrodes.

The amount of lithium which is incorporated in the host metal will be controlled depending upon the method of incorporation and to the amount most suitable for the end use contemplated. However, it has been found that as little as 10 micrograms of lithium introduced into a square centimeter of surface area of the host metal will provide good catalytic properties. Thus, for a satisfactory activated metal, the system should contain from about 10–200 micrograms of lithium with the optimum range being from about 75–150 micrograms of lithium introduced into a square centimeter of surface area of the host metal.

Having described the invention in general terms, the following examples are set forth to more particularly illustrate the invention. Examples 1–7 demonstrate the preparation of the lithium structure.

EXAMPLE 1

A platinum foil is immersed in molten lithium at 230° C. and held for 1/10 of a second. The host metal with lithium diffused into its surface is heated to approximately 520° C. for a period of five minutes before the system is immersed in water to remove excess lithium. The complete operation is performed under an atmosphere of helium which is substantially free of nitrogen and oxygen.

EXAMPLE 2

A thin sheet (eight mils thick) of palladium is immersed in a molten 30% lithium–70% calcium alloy eutectic mixture (temperatures being from about 230–260° C.) for a period of 1/8 to one minute. The lithium-host metal system was removed from the melt and heated to a temperature of 600° C. for two minutes before immersing the system in water to remove excess lithium. The lithiation is substantially uniform throughout the metal surface. The operation is carried out under an atmosphere of argon, substantially free of nitrogen and oxygen.

EXAMPLE 3

A palladium-silver alloy composed of 25% silver and 75% palladium was dipped into molten lithium at 250° C. for 1/10 of a second and excess lithium adhering to the surface wiped off. The coated structure was then heated at 600° C. for two minutes. Thereafter, the wire was immersed in distilled water and no reaction of lithium with water was observed. A portion of the so-treated alloy when subjected to a flame test indicated the presence of lithium in the structure. The operation was carried out in an atmosphere of argon substantially free of nitrogen and oxygen.

EXAMPLE 4

A nickel sheet eight mils in thickness is immersed for 35 minutes in molten lithium at a temperature of about 450° C. The nickel sheet is removed from the lithium melt and excess lithium wiped off. Upon immersion in water, no lithium and water reaction is observed. The operation was carried out in an atmosphere of argon substantially free of nitrogen and oxygen.

EXAMPLE 5

A nickel sheet eight mils in thickness is immersed for three hours in a molten lithium melt at a temperature of about 450° C. The nickel sheet is removed from the lithium melt and excess lithium wiped off. Upon immersion in water, no reaction of lithium and water was observed. The operation was carried out in an atmosphere of argon substantially free of nitrogen and oxygen. A flame test on a portion of the treated nickel structure gave a very positive indication of the presence of lithium in the nickel.

EXAMPLE 6

A 1% silver–99% palladium alloy is immersed in a 10% lithium bromide solution in pyridine. An inert counter-electrode is inserted into the solution and an electric current applied. The lithium is electroplated from the solution onto the silver-palladium foil. After depositing 20 micrograms of lithium per square centimeter of surface area, the plated alloy is heated to 480° C. for five minutes. Upon immersion in water, lithium is not observed to react with water. The reaction was carried out in an atmosphere of argon substantially free of nitrogen and oxygen. A flame test indicated that the alloy contained lithium. The lithiated metal is polished to provide a smooth electrode surface.

EXAMPLE 7

An alloy of 14% rhodium and 86% platinum was constructed as a sheet 2½ mils thick. The sheet was maintained in a suitable vapor deposition apparatus containing lithium in a molybdenum boat. The vapor deposition apparatus is evacuated and the boat containing lithium is electrically heated until the lithium is melted and its surface shiny, indicating its relative purity. The rhodium-platinum alloy is swiveled directly over and one inch above the molten lithium. Lithium vapors are permitted to deposit on the alloy for a period of two minutes. The alloy foil is reversed in order to deposit lithium on the second surface. Upon completion of the deposition, the sample is swiveled between tungsten heating elements and spaced an equal distance from each elements, where the total distance between the elements is between 3/8 and ½ inch. The sample is heated to 800° C. and held for three minutes. Upon immersion of the sample in water, no reaction between lithium and water was observed. A flame test on a portion of the sample demonstrated the presence of lithium in the alloy.

In Examples 1–7, the host metal can be replaced by other metals including silver, gold, copper and their alloys from group IB and iron, cobalt, nickel, ruthenium, rhodium, osmium, platinum, iridium, palladium and their alloys from group VIII of the Periodic Table. The elemental lithium in the above examples can be replaced by other metals including calcium, magnesium, rubidium and cesium.

The lithiated structures prepared in the above examples can be employed in constructing hydrogen purifiers, fuel cell electrodes, and as catalysts in hydrogenation, polymerization and reforming processes. Thus, a palladium-silver alloy membrane having lithium incorporated therein can be employed as a diffusion membrane in a hydrogen purifier, permitting the collection of hydrogen of high purity at low operating temperatures. The identical lithiated palladium-silver alloy membrane is useful as a hydrogen diffusion fuel cell electrode, permitting the use of impure hydrogen fuels in the cell since the impurities will not permeate the membrane, allowing their removal by suitable venting. The cells, due to the superior catalytic activity of the lithiated membrane, will perform satisfactorily at lower operating temperatures than a cell employing electrodes of the identical host material which have not been incorporated with lithium.

The lithiated metals of the instant invention are useful as catalysts in hydrogenation, reforming and polymerization processes. Thus, lithiated metals in powder or granular form permit hydrogenation reactions to take place at relatively low temperatures and pressures. It is indicated, although this has not been definitely established, that the materials permit selective hydrogenation under controlled conditions. The lithiated metals resist catalytic poisoning.

In order to more completely illustrate the utility of the invention, a fuel cell was devised in a suitable housing having a sintered porous nickel structure, lithiated as described in Example 4 as the anode and a sintered porous platinum-rhodium alloy, lithiated as in Example 7 as the cathode and using a 28% aqueous potassium hydroxide electrolyte. The cell when operated at atmospheric pressure and 100° C. employing hydrogen as the fuel demonstrated excellent electrochemical performance characteristics.

While various modifications of this invention are described, it should be appreciated that the instant invention is not restricted thereto, but that other embodiments of the invention will become apparent to one skilled in the art which come within the scope and spirit of the invention and the appended claims.

What is claimed is:

1. The method of making a lithiated catalytic material comprising the steps of (1) depositing elemental lithium onto a host metal, (2) heating the metal-lithium system of step 1 to a temperature of from above about 250° C. but below the melting point of the host metal, and (3) cooling the material, said host metal being a member selected from the group consisting of Group Ib and VIII metals of the Mendeleev's Periodic Table.

2. The method of claim 1 wherein lithium is deposited by vapor deposition.

3. The method of claim 1 wherein lithium is deposited from an eutectic mixture of lithium and a member of the group consisting of barium and calcium.

4. The method of claim 1 wherein the lithium is deposited by electroplating.

5. The method of claim 1 wherein lithium is deposited from a solution of lithium dissolved in liquid ammonia.

References Cited by the Examiner

UNITED STATES PATENTS

| | | | |
|---|---|---|---|
| 1,695,687 | 12/1928 | Holborn | 75—170 |
| 2,716,670 | 8/1955 | Bacon | 136—86 |
| 2,773,011 | 12/1956 | Haensel | 252—474 X |
| 2,818,350 | 12/1957 | Kavanagh | 252—476 X |
| 2,836,633 | 5/1958 | Esmay et al. | 252—476 X |
| 2,861,983 | 11/1958 | Fotis | 252—476 X |
| 2,914,596 | 11/1959 | Gorin et al. | 136—120 X |
| 3,042,551 | 7/1962 | Perry | 136—86 X |

FOREIGN PATENTS

| | | |
|---|---|---|
| 312,717 | 11/1928 | Great Britain. |
| 531,358 | 1/1941 | Great Britain. |

OTHER REFERENCES

Gilbert: Abstract of Application Serial No. 748,353, published May 16, 1950, O.G. 634, page 985.

MAURICE A. BRINDISI, *Primary Examiner.*